(12) United States Patent
Akula et al.

(10) Patent No.: US 11,212,497 B2
(45) Date of Patent: Dec. 28, 2021

(54) METHOD AND APPARATUS FOR PRODUCING 360 DEGREE IMAGE CONTENT ON RECTANGULAR PROJECTION BY SELECTIVELY APPLYING IN-LOOP FILTER

(71) Applicant: SAMSUNG ELECTRONICS CO., LTD., Suwon-si (KR)

(72) Inventors: Sri Nitchith Akula, Eluru (IN); Amith Dsouza, Bangalore (IN); Anubhav Singh, Bangalore (IN); Ramkumaar Kovil Kanthadai, Bangalore (IN); Chirag Pujara, Bangalore (IN); Raj Narayana Gadde, Bangalore (IN); Kwang-pyo Choi, Gwacheon-si (KR); Elena Alshina, Seoul (KR); Woong-il Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 16/476,716

(22) PCT Filed: Mar. 30, 2018

(86) PCT No.: PCT/KR2018/003829
§ 371 (c)(1),
(2) Date: Jul. 9, 2019

(87) PCT Pub. No.: WO2018/182377
PCT Pub. Date: Oct. 4, 2018

(65) Prior Publication Data
US 2021/0329204 A1 Oct. 21, 2021

(30) Foreign Application Priority Data

Mar. 30, 2017 (IN) .............................. 201741011436
Mar. 26, 2018 (IN) .............................. 201741011436

(51) Int. Cl.
*H04N 9/31* (2006.01)
*H04N 19/597* (2014.01)
*H04N 19/82* (2014.01)

(52) U.S. Cl.
CPC .......... *H04N 9/3185* (2013.01); *H04N 19/597* (2014.11); *H04N 19/82* (2014.11)

(58) Field of Classification Search
None
See application file for complete search history.

(56) References Cited

U.S. PATENT DOCUMENTS

2014/0098866 A1 4/2014 Chiu et al.
2018/0048890 A1* 2/2018 Kim ....................... H04N 19/82

FOREIGN PATENT DOCUMENTS

WO 2016/140439 A1 9/2016

OTHER PUBLICATIONS

Search Report and Written Opinion dated Jul. 12, 2018, issued by the International Searching Authority in International Application No. PCT/KR2018/003829 (PCT/ISA/210 and PCT/ISA/237).

(Continued)

*Primary Examiner* — Christopher Braniff
(74) *Attorney, Agent, or Firm* — Sughrue Mion, PLLC

(57) ABSTRACT

Accordingly embodiments herein disclose a method for producing 360 degree image content on a rectangular projection. The method includes detecting whether at least one discontinuous boundary is present in the 360-degree image content, wherein the at least one discontinuous boundary is detected using the packing of one or more projection segments. Further, the method includes obtaining one or more reconstructed blocks from the 360-degree image content. The reconstructed blocks are generated from the 360 degree image content. Further, the method includes performing one of enabling at least one in-loop filtering function on the one (Continued)

or more reconstructed blocks of the 360 degree image content when the at least one of image content discontinuous boundary is not present and disabling at least one in-loop filtering function on the one or more reconstructed blocks of the 360 degree image content located around the at least one discontinuous boundary.

15 Claims, 10 Drawing Sheets

(56) References Cited

OTHER PUBLICATIONS

Norkin, et al., "HEVC deblocking filtering and decisions", Oct. 15, 2012, Applications of Digital Image Processing XXXV, Proc. SPIE 8499, vol. 8499, 8 pages total.

Song, et al., "3D-HEVC Deblocking filter for Depth Video Coding", Jul. 2015, The Korean Institute of Broadcast and Media Engineers Summer Conference, p. 464-465, 2 pages total.

Park, S., et al., "Hardware Design of In-loop Filter for High Performance HEVC Encoder", Feb. 2016, Journal of the Korea Institute of Information and Communication Engineering, vol. 20, No. 2, p. 335-342, 8 pages total.

Lin, Hung-Chih et al., "AHG8: Compact cube layout with title partition", Joint Video Exploration Team (JVET) of ITU-T SG 16 WP 3 and ISO/IEC JTC 1/SC 29/WG 11, 4th Meeting: Chengdu, CN, Oct. 15, 2016-Oct. 21, 2016, Docuemtn: JVET-D0104, MediaTek Inc., XP030150347. (6 pages total).

Ye, Yan et al., "Algorithm descriptions of projection format conversion and video quality metrics in 360Lib", Joint Video Exploration Team (JVET) of ITU-T SG 16 WP 3 and ISO/IEC JTC 1/SC 29/WG 11, 5th Meeting: Geneva, CH, Jan. 12, 2017-Jan. 20, 2017, Document: JVET-E1003, XP030150650. (22 pages total).

Search Report dated Jul. 30, 2019 by the European Patent Office in counterpart European Patent Application No. 18774501.3.

* cited by examiner

[Fig. 1]
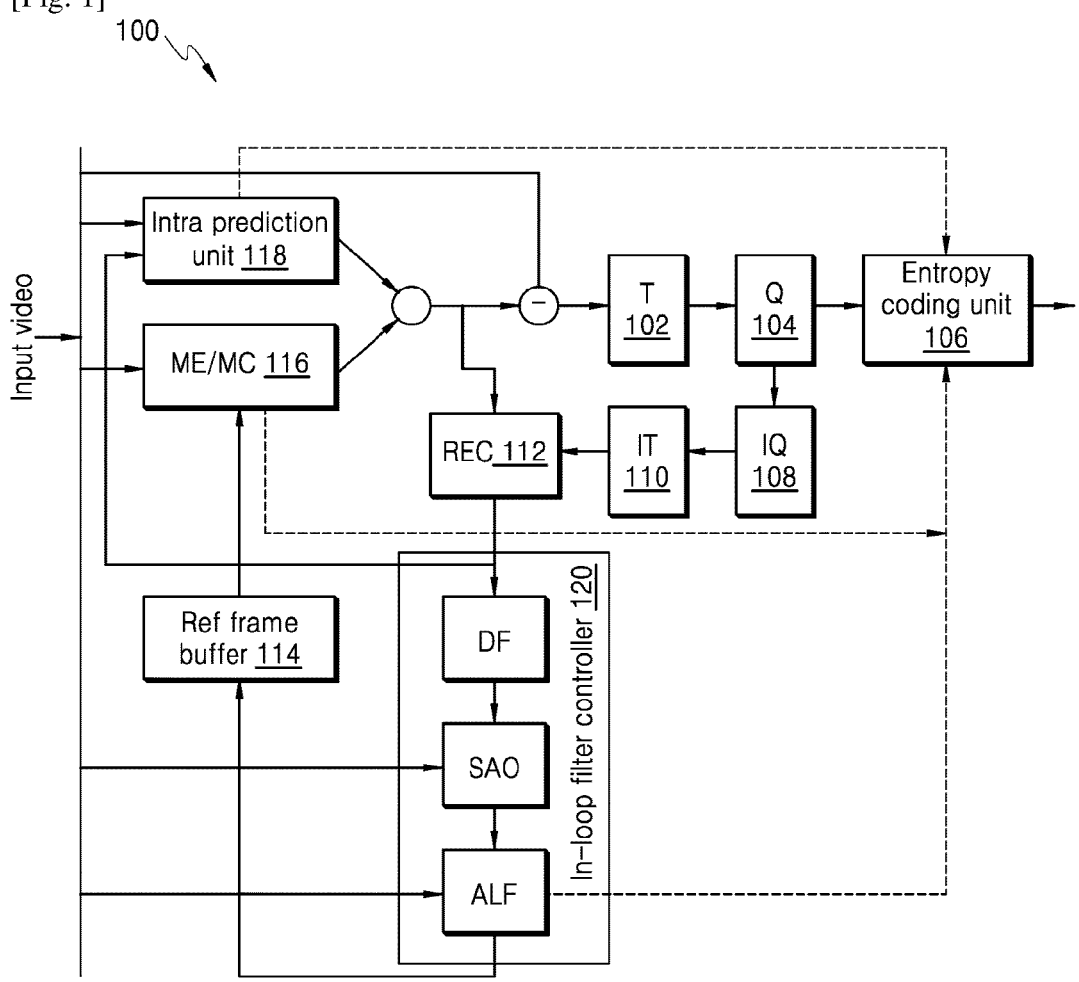

[Fig. 2]
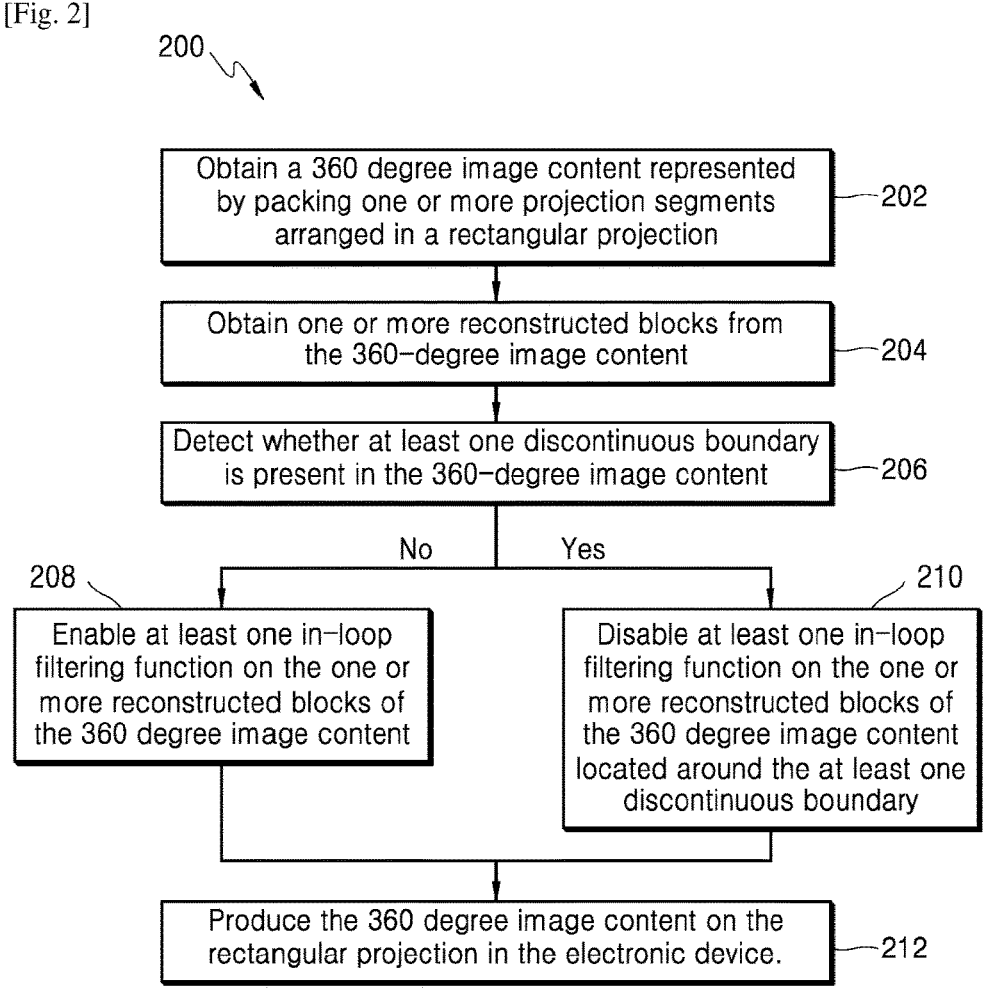
[Fig. 3]
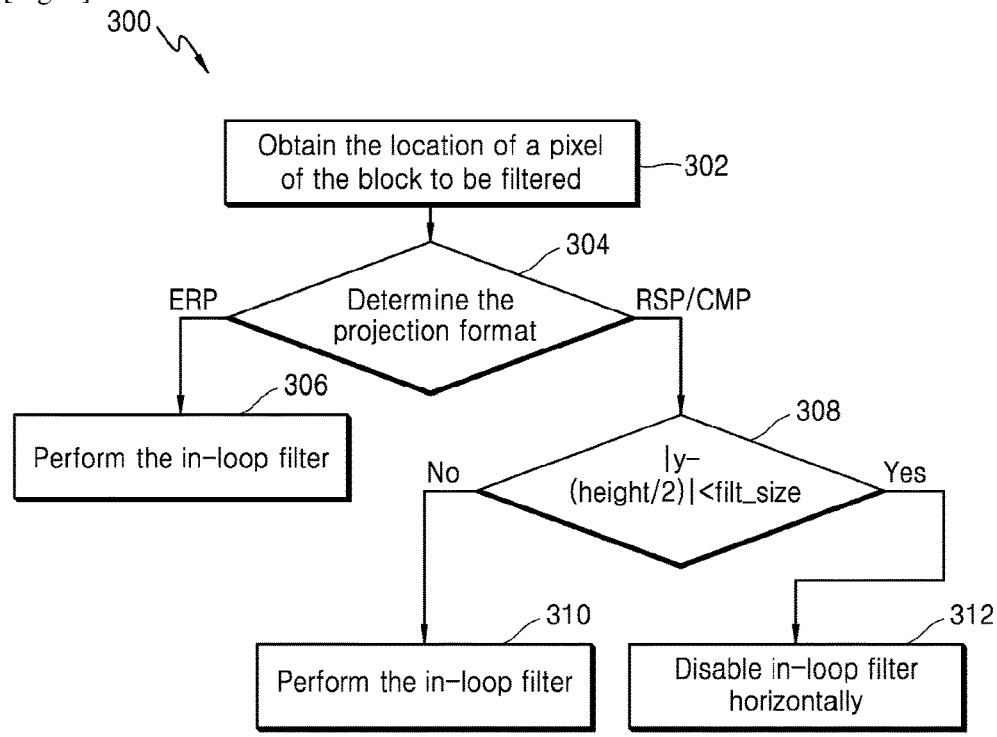

[Fig. 4A]
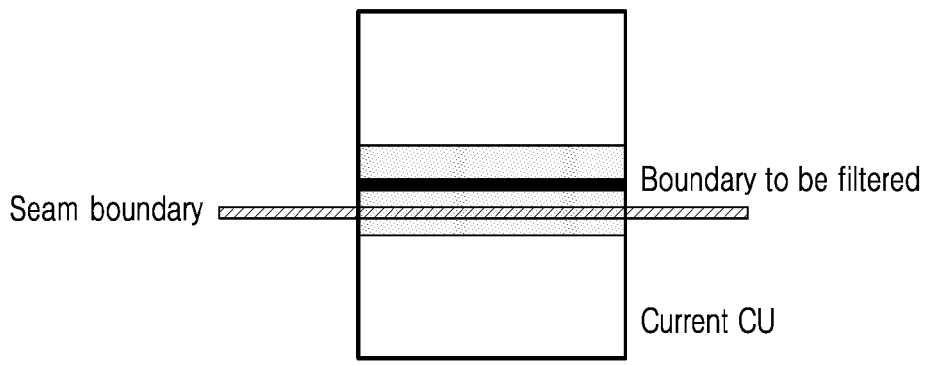
Current CU includes seam boundary
[Fig. 4B]
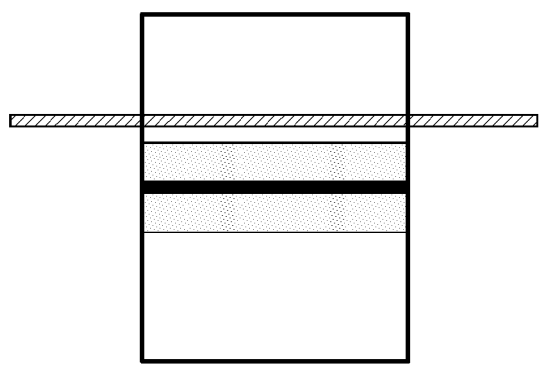
The neighboring CU includes seam boundary
[Fig. 5]
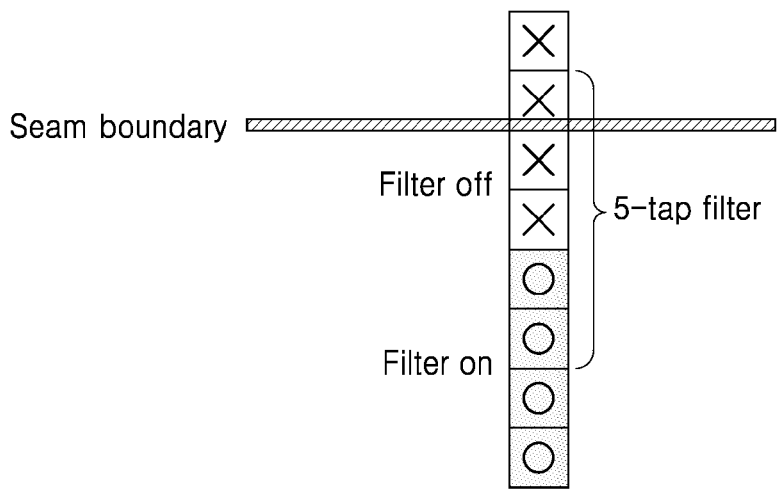

[Fig. 6A]
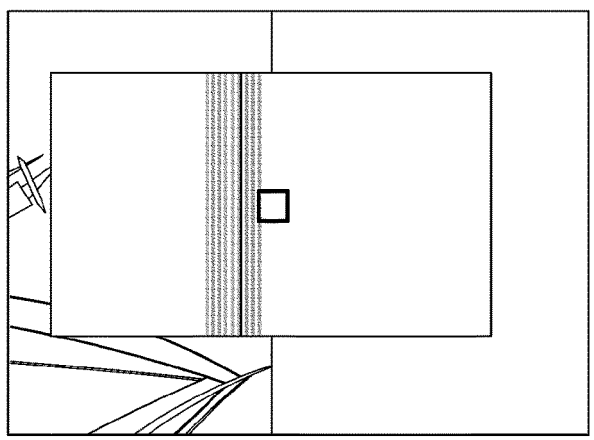
[Fig. 6B]
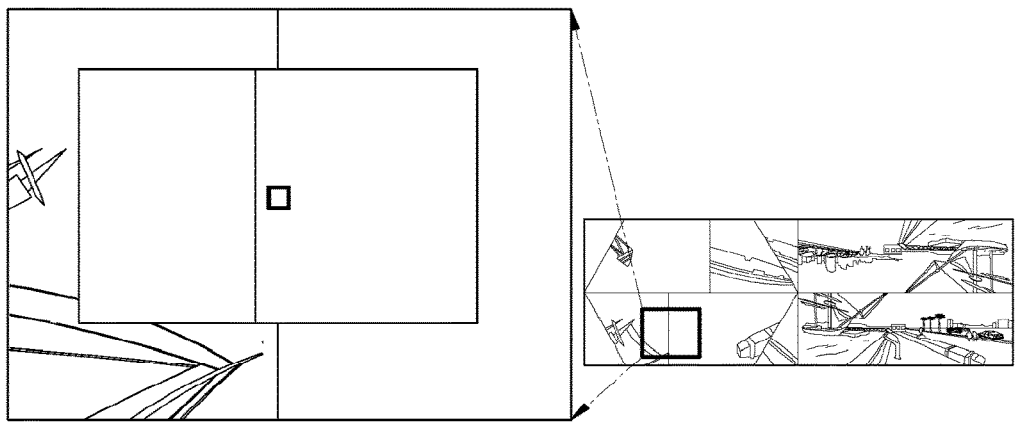
[Fig. 7A]
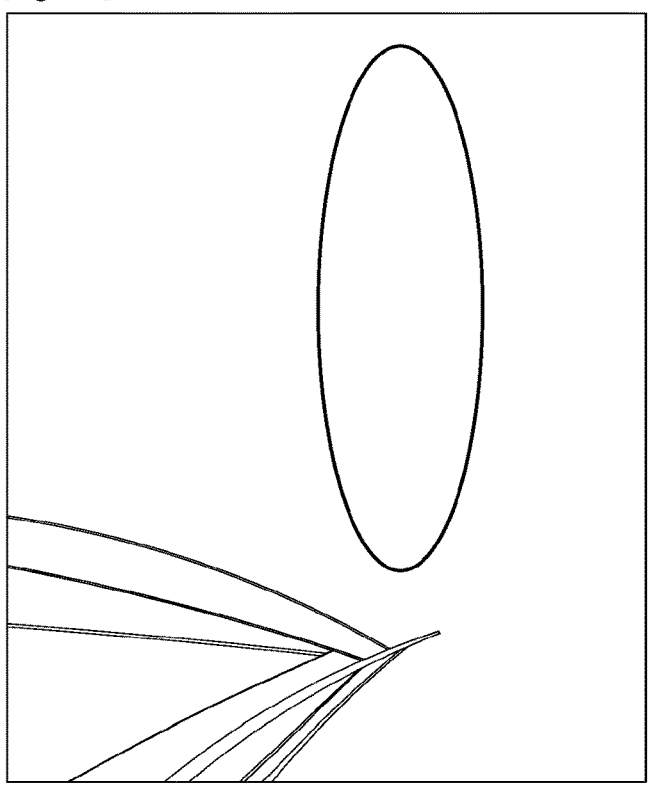

[Fig. 7B]
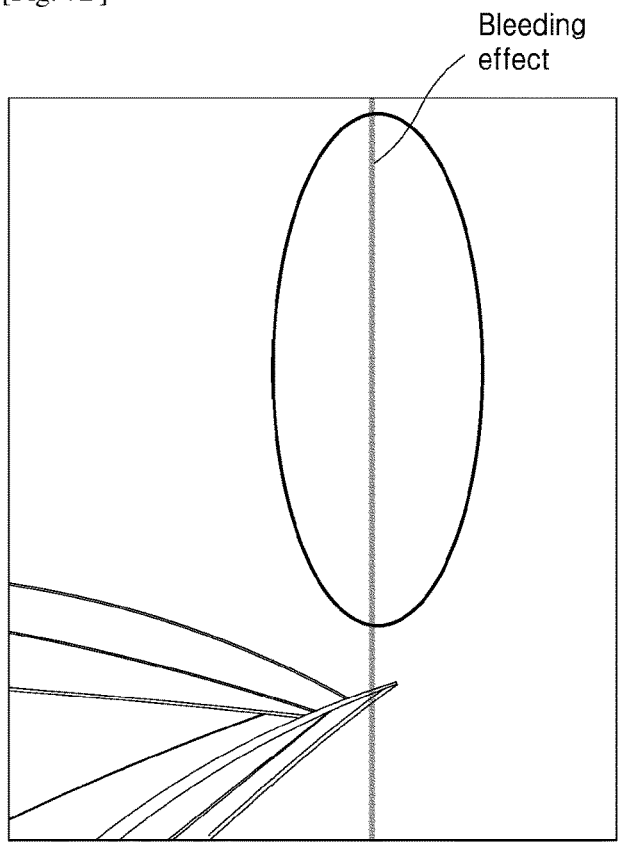
[Fig. 8A]
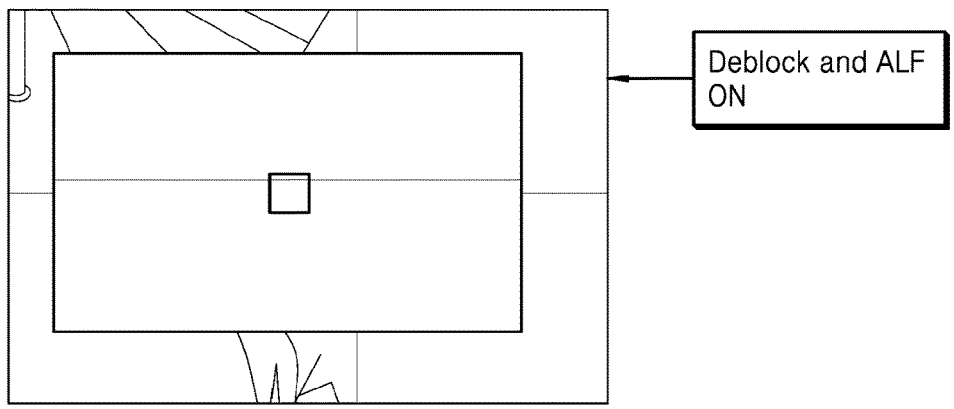
[Fig. 8B]
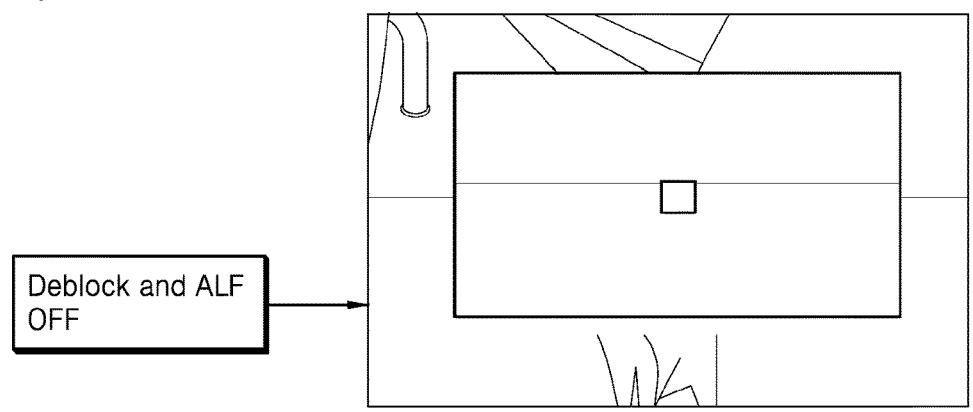

[Fig. 8C]
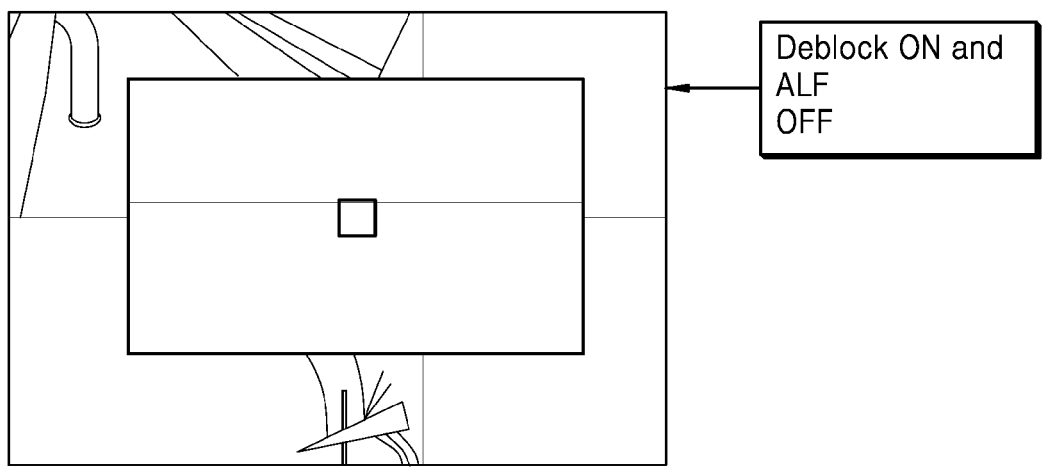
[Fig. 8D]
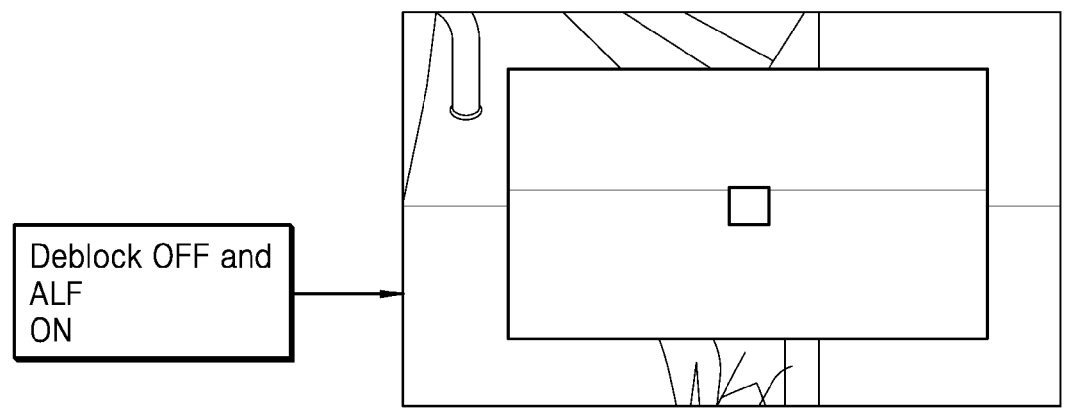

[Fig. 9A]
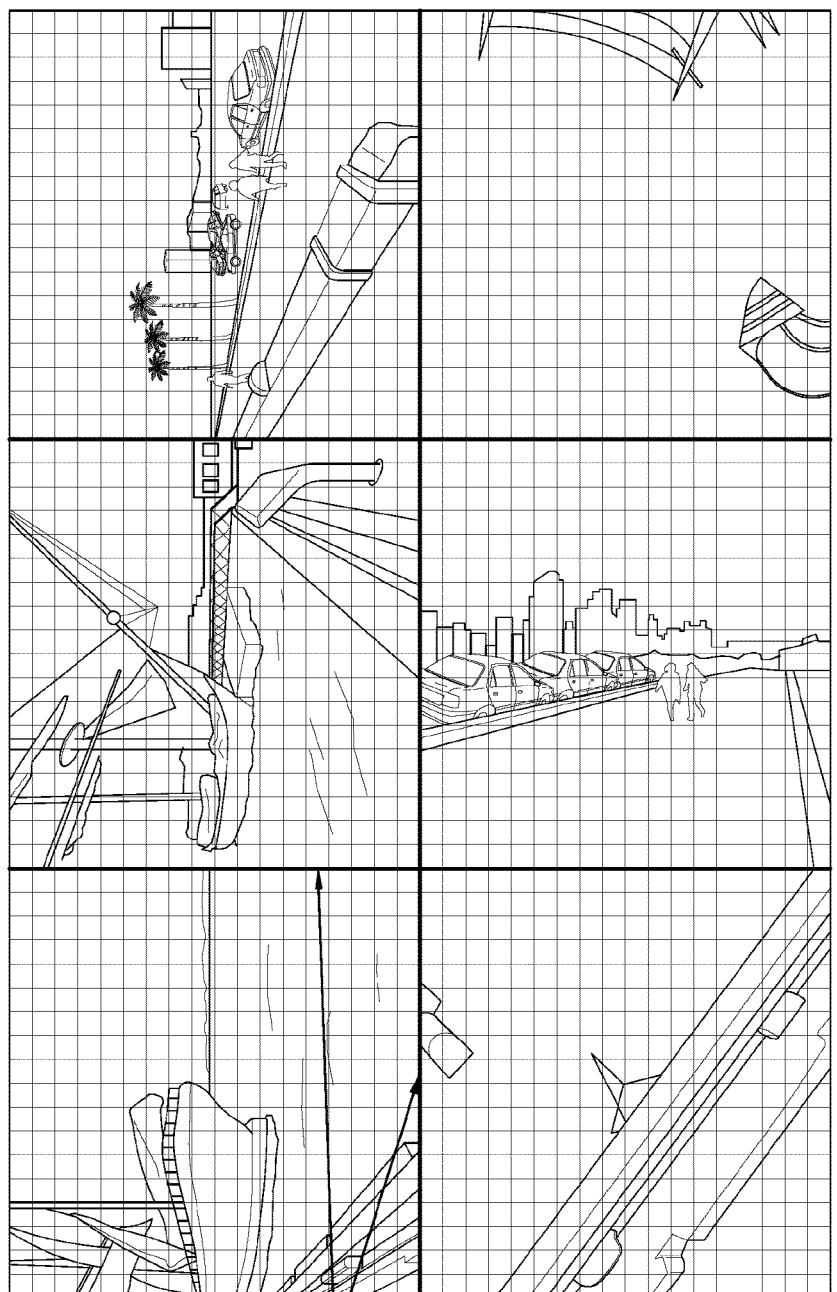

[Fig. 9B]
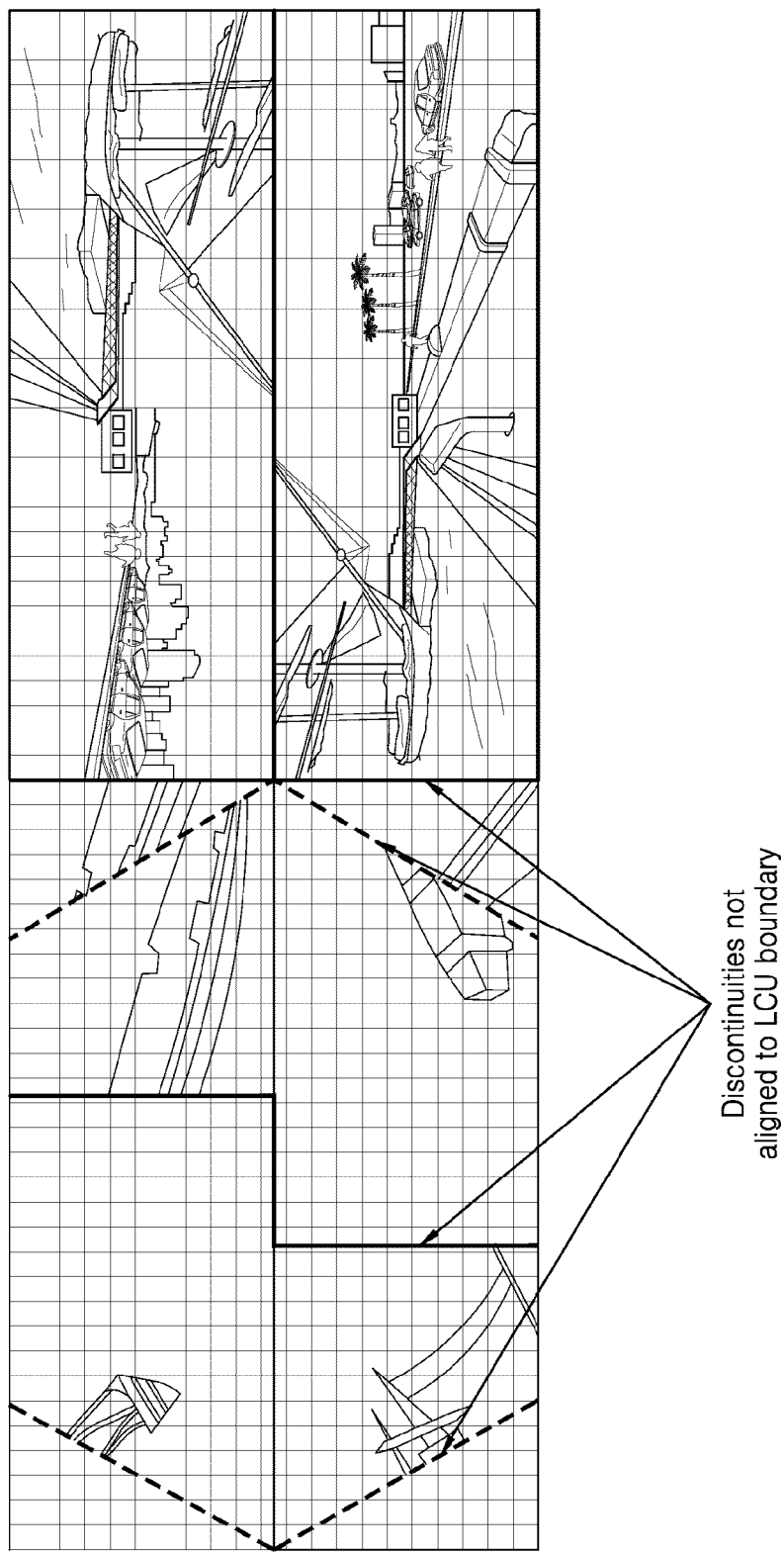

[Fig. 10A]
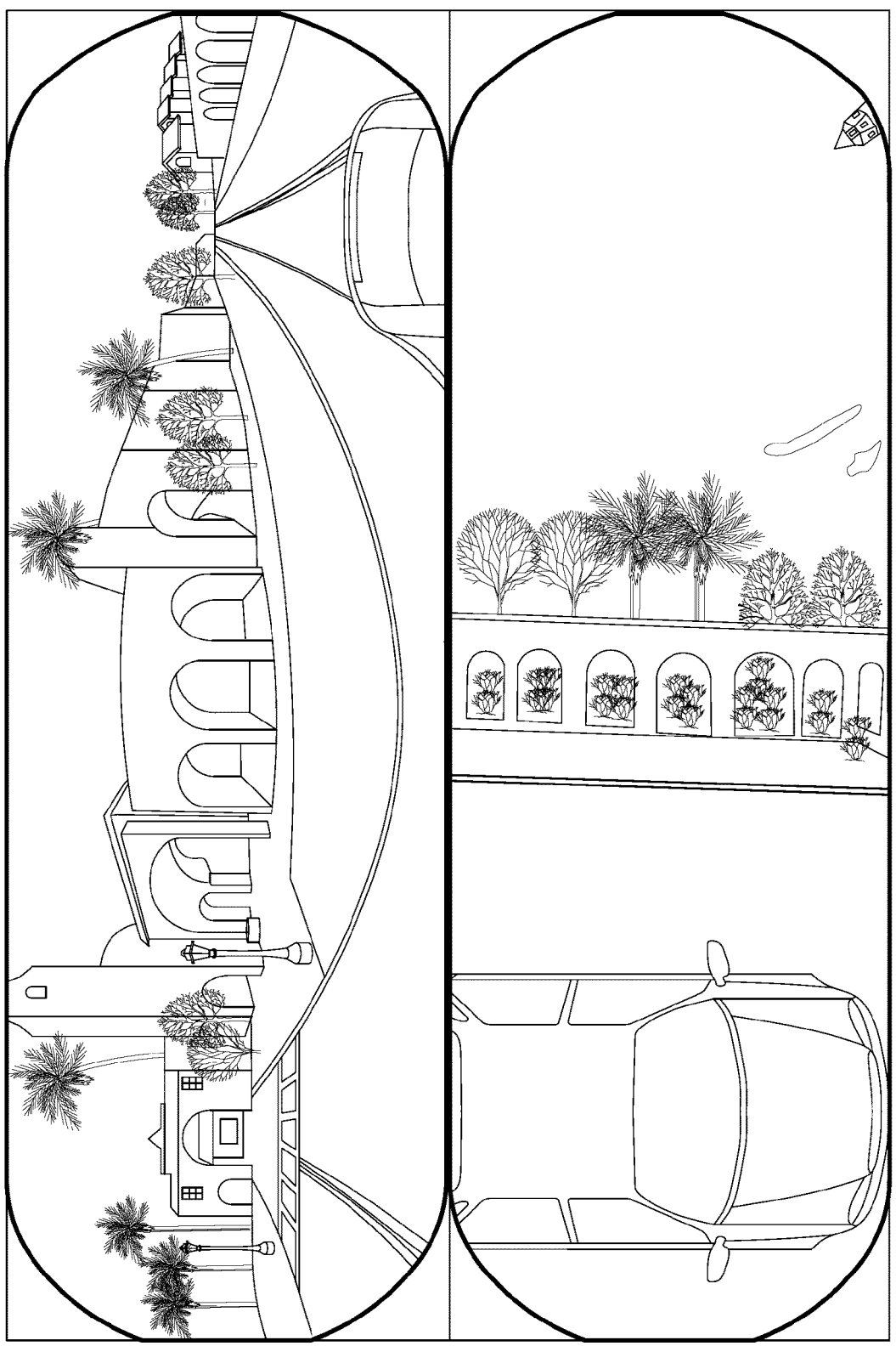

[Fig. 10B]
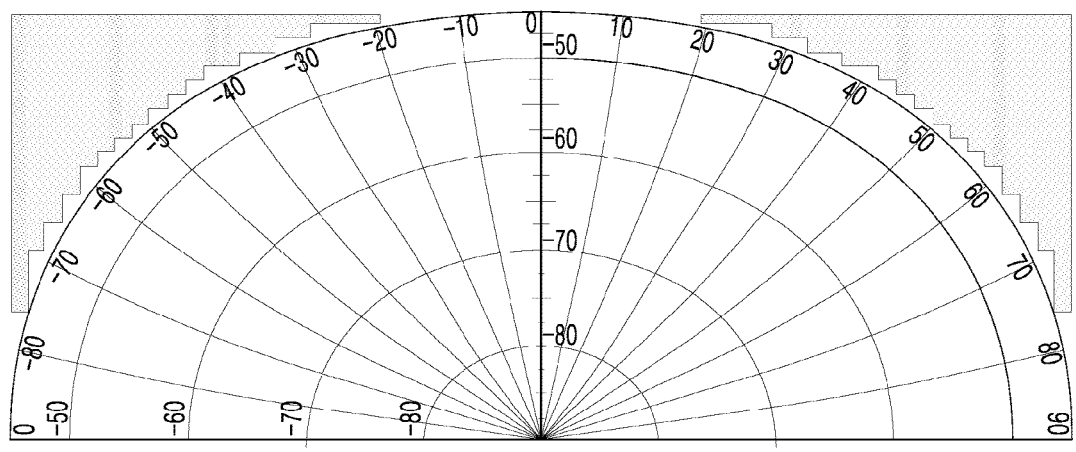

METHOD AND APPARATUS FOR PRODUCING 360 DEGREE IMAGE CONTENT ON RECTANGULAR PROJECTION BY SELECTIVELY APPLYING IN-LOOP FILTER

TECHNICAL FIELD

The present disclosure relates to a content processing, and more specifically related to a method and system for producing 360 degree image content on a rectangular projection in an electronic device by selectively applying an in-loop filter. The present application is based on, and claims priority from an Indian Application Number 201741011436 filed on 30 Mar. 2017, the disclosure of which is hereby incorporated by reference herein.

BACKGROUND ART

Various projection formats which are known to represent a 360 degree video content include an equi-rectangular format, an Icosahedron format, an octahedral format and a cube mapping format. Many conventional designs are proposed for producing the 360 degree video on a rectangular projection in the electronic device using video coding standards. The conventional video coding standards generally adopt a block based coding technique to exploit spatial and temporal redundancy. In an example, a basic approach is to divide a source frame into a plurality of blocks, perform intra prediction/inter prediction on each block, transform residues of each block, and perform quantization and entropy encoding. Besides, a reconstructed frame is generated to provide reference pixel data used for coding following blocks. For certain video coding standards, an in-loop filter may be used for enhancing an image quality of the reconstructed frame. A video decoder is used to perform an inverse operation of a video encoding operation performed by a video encoder. In an example, a reconstructed frame is generated in the video decoder to provide reference pixel data used for decoding following blocks, and the in-loop filter is used by the video decoder for enhancing the image quality of the reconstructed frame.

In the conventional video coding standards, block boundary artifacts resulting from a coding error can be greatly removed by using an in-loop filtering process to accomplish higher subjective and objective quality. However, it is possible that the image frame with a 360-degree image content has image content discontinuity edges that are not caused by coding errors. The conventional in-loop filtering process does not detect such discontinuity. As a result, these discontinuity edges may be locally blurred by the in-loop filtering process. This results in undesired image quality degradation. Further, current projection format suffers from discontinuities while converting a spherical content to a 2D planar content.

Thus, it is desired to address the above mentioned disadvantages or other shortcomings or at least provide a useful alternative.

DISCLOSURE OF INVENTION

Technical Problem

The principal object of the embodiments herein is to provide a method and system for producing a 360 degree image content on a rectangular projection in an electronic device.

Solution to Problem

Another object of the embodiment herein is to obtain a set of reconstructed blocks from the 360 degree image content, where the 360 degree image content is represented by packing one or more projection segments arranged in a rectangular projection.

Another object of the embodiment herein is to detect whether at least one discontinuous boundary is present in the 360-degree image content, where the at least one discontinuous boundary is detected using the packing of one or more projection segments.

Another object of the embodiment herein is to detect the image content discontinuous boundary while converting a spherical content to a two dimensional (2D) planar content.

Another object of the embodiment herein is to detect the image content discontinuous boundary while converting a non-compact projection format to a 2D rectangular format.

Another object of the embodiment herein is to disable at least one in-loop filter for a filtering function on reconstructed blocks located nearby the least one image content discontinuous boundary in the image frame in response to the at least one of image content discontinuous boundary is detected.

Another object of the embodiment herein is to enable the at least one in-loop filter for the filtering function on at least one continuous area in the image frame in response to the at least one of image content discontinuous boundary is not detected.

Another object of the embodiment herein is to provide the at least one in-loop filter for not applying the in-loop filtering function to the reconstructed blocks located nearby the least one image content discontinuous boundary to manage a bleeding effect across the at least one image content discontinuous boundary.

Another object of the embodiment herein is to provide the at least one in-loop filter for not applying the in-loop filtering function to the reconstructed blocks located at the least one image content discontinuous boundary to manage at least one pixels across the least one image content discontinuous boundary within the image frame.

Another object of the embodiment herein is to process the set of reconstructed blocks to produce the 360-degree projection layout by applying the at least one in-loop filter in at least one continuous area in the image frame.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1 illustrates a block diagram of a video encoder, according to an embodiment as disclosed herein;

FIG. 2 is a flow diagram illustrating a method for producing 360 degree image content on a rectangular projection in an electronic device, according to an embodiment as disclosed herein;

FIG. 3 is a flow diagram illustrating various operations for determining the discontinuity and disabling horizontal filtering in case of RSP/CMP, according to an embodiment as disclosed herein;

FIGS. 4A and 4B are example scenarios in which the deblocking filter is turned off based on whether a coding unit (CU) includes a boundary, according to an embodiment as disclosed herein;

FIG. 5 is an example scenario in which the deblocking filter is turned off based on a filtering pixel position, according to an embodiment as disclosed herein;

FIG. 6A is an example scenario in which bleeding effect is depicted due to a deblocking filter, according to an embodiment as disclosed herein;

FIG. 6B is an example scenario in which the bleeding effect is eliminated by disabling the deblocking filter, while converting a spherical content to a two dimensional (2D) planar content, according to an embodiment as disclosed herein;

FIGS. 7A and 7B are example scenarios in which the bleeding effect is shown by deblocking ON condition and deblocking off condition, according to an embodiment as disclosed herein;

FIG. 8A to FIG. 8D are example scenarios in which the bleeding effects are shown for various conditions, according to an embodiment as disclosed herein;

FIG. 9A is an example scenario in which discontinuities is not aligned to a largest coding unit (LCU) boundary for a cube-map based projection format, according to an embodiment as disclosed herein;

FIG. 9B is an example scenario in which discontinuities is not aligned to a LCU boundary for a ISP based projection format, according to an embodiment as disclosed herein; and FIG. 10A and FIG. 10B depict a discontinuity in case of RSP based projection format, according to an embodiment as disclosed herein.

BEST MODE FOR CARRYING OUT THE INVENTION

Accordingly embodiments herein disclose a method for producing 360 degree image content on a rectangular projection in an electronic device. The method includes obtaining a 360 degree image content represented by packing one or more projection segments arranged in a rectangular projection. Further, the method includes detecting whether at least one discontinuous boundary is present in the 360-degree image content. The at least one discontinuous boundary is detected using the packing of one or more projection segments. Further, the method includes obtaining one or more reconstructed blocks from the 360-degree image content. The reconstructed blocks are generated from the 360 degree image content. Further, the method includes performing one of enabling at least one in-loop filtering function on the one or more reconstructed blocks of the 360 degree image content when the at least one of image content discontinuous boundary is not present and disabling at least one in-loop filtering function on the one or more reconstructed blocks of the 360 degree image content located around the at least one discontinuous boundary. Further, the method includes producing the 360 degree image content on the rectangular projection in the electronic device.

According to an embodiment, the at least one image content discontinuous boundary is located between neighboring reconstructed blocks within the image frame.

According to an embodiment, the image content discontinuous boundary is detected while converting a spherical content to a two dimensional (2D) planar content.

According to an embodiment, the image content discontinuous boundary is detected while converting a non-compact projection format to a two dimensional (2D) rectangular format.

According to an embodiment, the at least one in-loop filter comprises at least one of a deblocking filter, a Sample Adaptive Offset (SAO) filter, and an Adaptive Loop Filter (ALF).

According to an embodiment, the at least one in-loop filter does not apply the in-loop filtering function to the reconstructed blocks located nearby the least one image content discontinuous boundary to manage a bleeding effect across the at least one image content discontinuous boundary.

According to an embodiment, the at least one in-loop filter does not apply the in-loop filtering function to the reconstructed blocks located at the least one image content discontinuous boundary to manage at least one pixels across the least one image content discontinuous boundary within the image frame. In an embodiment, the set of reconstructed blocks is processed to produce the 360-degree projection layout by applying the at least one in-loop filter in at least one continuous area in the image frame.

According to an embodiment, the at least one in-loop filter is applied to at least one continuous area in the image frame, and the at least one in-loop filter is eliminated on the at least one of image content discontinuous boundary within the image frame.

According to an embodiment, the at least one in-loop filter is applied in at least one of a video encoding process and a video decoding process.

According to an embodiment, at least one of information about a projection type, a frame packing type and a loop filter disable flag is signaled in a bit-stream header, while producing the 360 degree image content on the rectangular projection.

Accordingly embodiments herein disclose an electronic device for producing 360 degree image content on a rectangular projection. The electronic device includes an in-loop filter controller coupled to a memory and a processor. The in-loop filter controller is configured to obtain the 360 degree image content represented by packing one or more projection segments arranged in the rectangular projection. The in-loop filter controller is configured to detect whether at least one discontinuous boundary is present in the 360-degree image content. The at least one discontinuous boundary is detected using the packing of one or more projection segments. The in-loop filter controller is configured to obtain one or more reconstructed blocks from the 360-degree image content. The reconstructed blocks are generated from the 360 degree image content. The in-loop filter controller is configured to perform one of enable at least one in-loop filtering function on the one or more reconstructed blocks of the 360 degree image content when the at least one of image content discontinuous boundary is not present and disable at least one in-loop filtering function on the one or more reconstructed blocks of the 360 degree image content located around the at least one discontinuous boundary. The in-loop filter controller is configured to produce the 360 degree image content on the rectangular projection in the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly embodiments herein achieve an electronic device for producing 360 degree image content on a rectangular projection. The electronic device includes an in-loop filter controller coupled to a memory and a processor. The in-loop filter controller is configured to obtain the 360 degree image content represented by packing one or more projection segments arranged in the rectangular projection. The in-loop filter controller is configured to detect whether at least one discontinuous boundary is present in the 360-degree image content. The at least one discontinuous boundary is detected using the packing of one or more projection segments. The in-loop filter controller is configured to obtain one or more reconstructed blocks from the 360-degree image content. The reconstructed blocks are generated from the 360 degree image content. The in-loop filter controller is configured to perform one of enable at least one in-loop filtering function on the one or more reconstructed blocks of the 360 degree image content when the at least one of image content discontinuous boundary is not present and disable at least one in-loop filtering function on the one or more reconstructed blocks of the 360 degree image content located around the at least one discontinuous boundary. Further, the in-loop filter controller is configured to produce the 360 degree image content on the rectangular projection in the electronic device.

Unlike conventional methods and conventional systems, the proposed method can be used to perform a selective in-loop filtering for a 360 video compression. The proposed method can be used to enhance a virtual reality (VR) viewing experience by providing better subjective quality with reduced seam artifacts caused by the loop filters in the conventional codecs. The proposed method can be used to enhance subjective quality of compressed 360 video by reducing seams which is present by using conventional codecs with the in-loop filters for the 360 content.

The proposed method can be used generate better reference frames and hence low bit-rate which would result in higher objective quality (BD-Rate). The method can be used to selectively turn off the filter (e.g., deblocking filter, SAO, ALF or the like) only at discontinuities of the projection format while encoding using conventional video codecs. This shall reduce the bleeding effect across seams. The reduced bleeding shall reduce the requirement for padding which shall provide higher compression efficiency. The padding assists in reducing the effect of the loop filters on seam boundary.

The method can be used to turn off the in-loop filter on the boundary of the discontinuous regions. This would avoid the bleeding and hence improve the objective/subjective quality.

The method can be used to enhance the compressed output quality by avoiding loop filters at the discontinuities of projection formats for the 360 video compression. The method can be used to enhance the subjective quality of the output with less computational complexity. If the projection formats are standardized then it does not need to flag any further information in the bit stream.

Referring now to the drawings, and more particularly to FIGS. 1 through 10b, there are shown preferred embodiments.

FIG. 1 illustrates a block diagram of a video encoder 100, according to an embodiment as disclosed herein. The video encoder 100 is arranged to encode an image frame to generate a bitstream as an output bitstream. In an example, the image frame may be generated from a video capture device (e.g., camera or the like). The video encoder includes a control circuit and an encoding circuit. The control circuit provides an encoder control logic over processing blocks of the encoding circuit. In an example, the control circuit may decide encoding parameters (e.g., control syntax elements or the like) for the encoding circuit, where the encoding parameters are signaled to a video decoder via the bitstream generated from the video encoder.

In general, the encoding circuit includes a residual calculation circuit (not shown), a transform circuit (denoted by "T") 102, a quantization circuit (denoted by "Q") 104, an entropy encoding circuit (e.g., a variable length encoder) 106, an inverse quantization circuit (denoted by "IQ") 108, an inverse transform circuit (denoted by "IT") 110, a reconstruction circuit 112, an in-loop filter controller 120, a reference frame buffer 114, an inter prediction circuit 116

(which includes a motion estimation circuit (denoted by "ME") and a motion compensation circuit (denoted by "MC")), an intra prediction circuit (denoted by "IP") 118, an intra/inter mode selection switch (not shown), and an in-loop filter controller 120. The residual calculation circuit is used for subtracting a predicted block from a current block to be encoded to generate residual of the current block to the following transform circuit 102. The predicted block may be generated from the intra prediction circuit 118 when the intra/inter mode selection switch is controlled by an intra prediction mode selected, and may be generated from the inter prediction circuit 116 when the intra/inter mode selection switch is controlled by an inter prediction mode selected. After being sequentially processed by the transform circuit 102 and the quantization circuit 104, the residual of the current block is converted into quantized transform coefficients, where the quantized transform coefficients are entropy encoded at the entropy encoding circuit 106 to be a part of the bitstream.

Further, the encoding circuit includes an internal decoding circuit. Hence, the quantized transform coefficients are sequentially processed via the inverse quantization circuit 108 and the inverse transform circuit 110 to generate decoded residual of the current block to the following reconstruction circuit 112. The reconstruction circuit 112 combines the decoded residual of the current block and the predicted block of the current block to generate the reconstructed block of a reference frame (which is a reconstructed frame) stored in the reference frame buffer 114. The inter prediction circuit 116 may use one or more reference frames in the reference frame buffer 114 to generate the predicted block under inter prediction mode. Before the reconstructed block is stored into the reference frame buffer 114, the in-loop filter controller 120 may perform an in-loop filtering function for the in-loop filter upon the reconstructed block. In an example, the in-loop filter may include a deblocking filter (DBF), a sample adaptive offset (SAO) filter, and/or an adaptive loop filter (ALF).

In an embodiment, the in-loop filter controller 120 is configured to obtain the 360 degree image content represented by packing one or more projection segments arranged in the rectangular projection. Further, the in-loop filter controller 120 is configured to detect whether at least one discontinuous boundary is present in the 360-degree image content. The at least one discontinuous boundary is detected using the packing of one or more projection segments. The in-loop filter controller 120 is configured to obtain one or more reconstructed blocks from the 360-degree image content. The reconstructed blocks are generated from the 360 degree image content. The in-loop filter controller 120 is configured to perform one of enable at least one in-loop filtering function on the one or more reconstructed blocks of the 360 degree image content when the at least one of image content discontinuous boundary is not present and disable at least one in-loop filtering function on the one or more reconstructed blocks of the 360 degree image content located around the at least one discontinuous boundary.

In another embodiment, the in-loop filter controller 120 is configured to enable at least one in-loop filter for the filtering function on at least one continuous area in the image frame in response to the at least one of image content discontinuous boundary is not detected. The in-loop filter controller 120 is configured to produce the 360 degree image content on the rectangular projection in an electronic device.

In an embodiment, the at least one image content discontinuous boundary is located between neighboring reconstructed blocks within the image frame.

In an embodiment, the image content discontinuous boundary is detected while converting a spherical content to a 2D planar content. In another embodiment, the image content discontinuous boundary is detected while converting a non-compact projection format to the 2D rectangular format.

In an embodiment, the at least one in-loop filter does not apply the in-loop filtering function to the reconstructed blocks located nearby the least one image content discontinuous boundary to manage a bleeding effect across the at least one image content discontinuous boundary.

In an embodiment, the at least one in-loop filter does not apply the in-loop filtering function to the reconstructed blocks located at the least one image content discontinuous boundary to manage at least one pixels across the least one image content discontinuous boundary within the image frame. In an embodiment, the set of reconstructed blocks are processed to produce the 360-degree projection layout by applying the at least one in-loop filter in at least one continuous area in the image frame.

In an embodiment, the at least one in-loop filter is applied to at least one continuous area in the image frame, and the at least one in-loop filter is eliminated on the at least one of image content discontinuous boundary within the image frame.

In an embodiment, the at least one in-loop filter is applied in at least one of a video encoding process and a video decoding process.

Similar to the video encoder: The video decoder may communicate with the video encoder via a transmission unit (e.g., wired/wireless communication link or the like). The video decoder is arranged to receive the bitstream as an input bitstream and decode the received bitstream to generate a decoded frame image. In an example, the decoded frame image may be displayed on a display device. The video decoder includes an entropy decoding circuit (e.g., a variable length decoder), an inverse quantization circuit (denoted by "IQ"), an inverse transform circuit (denoted by "IT"), a reconstruction circuit, a motion vector calculation circuit (denoted by "MV Calculation"), a motion compensation circuit (denoted by "MC"), an intra prediction circuit (denoted by "IP"), an intra/inter mode selection switch, at least one in-loop filter, and a reference frame buffer.

When a block is inter-coded, the motion vector calculation circuit refers to information parsed from the bitstream by the entropy decoding circuit to determine a motion vector between a current block of the frame being decoded and a predicted block of a reference frame that is a reconstructed frame and stored in the reference frame buffer. The motion compensation circuit may perform interpolation filtering to generate the predicted block according to the motion vector. The predicted block is supplied to the intra/inter mode selection switch. Since the block is inter-coded, the intra/inter mode selection switch outputs the predicted block generated from the motion compensation circuit to the reconstruction circuit.

When the block is intra-coded, the intra prediction circuit generates the predicted block to the intra/inter mode selection switch. Since the block is intra-coded, the intra/inter mode selection switch outputs the predicted block generated from the intra prediction circuit to the reconstruction circuit.

In addition, decoded residual of the block is obtained through the entropy decoding circuit, the inverse quantization circuit, and the inverse transform circuit. The reconstruction circuit combines the decoded residual and the predicted block to generate a reconstructed block. The reconstructed block may be stored into the reference frame buffer to be a part of a reference frame (which is a reconstructed frame) that may be used for decoding following blocks. Similarly, before the reconstructed block is stored into the reference frame buffer, the in-loop filter(s) may perform designated in-loop filtering upon the reconstructed block.

In an embodiment, the present disclosure provides an in-loop filter control scheme to prevent the in-loop filter from applying an in-loop filter process to an edge that is caused by packing of projection faces rather than caused by coding errors.

In an embodiment, the image frame to be encoded by the video encoder has a 360-degree image content represented by projection faces arranged in a 360-degree Virtual Reality (360 VR) projection layout. Hence, after the bitstream is decoded by the video decoder, the decoded image frame (i.e., reconstructed frame) also has a 360-degree image content represented by projection faces arranged in the same 360 VR projection layout. The projection faces are packed to form the image frame. To achieve better compression efficiency, the employed 360 VR projection layout may have the projection faces packed with proper permutation and/or rotation to maximally achieve continuity between different projection faces. However, due to inherent characteristics of the 360-degree image content and the projection format, there is at least one image content discontinuity edge resulting from packing of the projection faces in the image frame.

An existing tool available in a video coding standard (e.g., H.264, H.265, or VP9) can be used to disable an in-loop filtering process across slice/tile/segment boundary. When a slice/tile/segment boundary is also an image content discontinuity edge resulting from packing of the projection faces, the in-loop filtering process can be disabled at the image content discontinuity edge by using the existing tool without any additional changes made to the video encoder and the video decoder.

Since an existing tool available in a video coding standard (e.g., H.264, H.265, or VP9) can be used to disable the in-loop filtering process across slice/tile/segment boundary, the an in-loop filter controller 120 can properly set control syntax element(s) to disable the in-loop filter(s) at a partition boundary (which may be a slice boundary, a tile boundary or a segment boundary), such that no in-loop filtering is applied to reconstructed blocks located at an image content discontinuity edge (which is also the partition boundary). In addition, the control syntax element(s) used for controlling the in-loop filter(s) at the video encoder 100 are signaled to the video decoder via the bitstream, such that the in-loop filter(s) at the video encoder 100 are controlled by the signaled control syntax element(s) to achieve the same objective of disabling an in-loop filtering process at the partition boundary.

In an embodiment, in a bitstream header, information about projection type, frame packing type and a loop filter disable flag shall be signaled. From the three parameters, the boundary which shall be bypassed would be uniquely defined. In an example, if projection type is CMP and frame packing type is 3×2 and loop filter disable flag is set to 1 then the middle (yellow colored) boundary shall be bypassed while performing deblocking, SAO and ALF (In-loop filters).

TABLE 1

| | Descriptor |
|---|---|
| omnidirectional_projection_indication( payloadSize ) { | |
| omni_flag | u(1) |
| if(omni_flag) { | |
| projection_type | u(4) |
| packing_type | u(2) |
| dblk_off }} | u(1) |

In the example if projection type is cubemap, packing type is 3×2 and dblk_off is set to 1 then image titled "cubemap 3×2" the pixels on the boundary (shown in italic font) shall be excluded from the in loop filtering process.

The video encoder 100 and the video decoder are implemented in the electronic device. The electronic device can be, for example, but not limited to a smart phone, a Personal Digital Assistant (PDA), a tablet computer, a laptop computer, a VR headset or the like.

Although the FIG. 1 shows various hardware components of the video encoder 100 but it is to be understood that other embodiments are not limited thereon. In other embodiments, the video encoder 100 may include less or more number of components. Further, the labels or names of the components are used only for illustrative purpose and does not limit the scope of the embodiments as disclosed herein. One or more components can be combined together to perform same or substantially similar function to produce the 360 degree image content on the rectangular projection in the video encoder 100.

FIG. 2 is a flow diagram 200 illustrating a method for producing 360 degree image content on the rectangular projection in the electronic device, according to an embodiment as disclosed herein. The operations (202-212) are performed by the in-loop filter controller 120.

At 202, the method includes obtaining the 360 degree image content represented by packing one or more projection segments arranged in the rectangular projection/rectangular layout. At 204, the method includes obtaining one or more reconstructed blocks from the 360-degree image content. At 206, the method includes detecting whether the at least one discontinuous boundary is present in the 360-degree image content. The at least one discontinuous boundary is detected using the packing of one or more projection segments.

If the at least one discontinuous boundary is not present in the 360-degree image content then, at 208, the method includes enabling at least one in-loop filtering function on the one or more reconstructed blocks of the 360 degree image content. If the at least one discontinuous boundary is present in the 360-degree image content then, at 210, the method includes disabling at least one in-loop filtering function on the one or more reconstructed blocks of the 360 degree image content located around the at least one discontinuous boundary. At 212, the method includes producing the 360 degree image content on the rectangular projection in the electronic device.

The various actions, acts, blocks, steps, or the like in the flow diagram 200 may be performed in the order presented, in a different order or simultaneously. Further, in some embodiments, some of the actions, acts, blocks, steps, or the like may be omitted, added, modified, skipped, or the like without departing from the scope of the embodiments as disclosed herein.

FIG. 3 is a flow diagram 300 illustrating various operations for determining the discontinuity and disabling horizontal filtering in case of RSP/CMP, according to an embodiment as disclosed herein. The operations (302-312) are performed by the in-loop filter controller 120. At 302, the method includes obtaining location (X axis and y axis location) of the first pixel of the block to be filtered. At 304, the method includes determining whether the projection format of the 360 video based on a high level signalling metadata or any other pre-defined logic. If projection format is Equirectangular projection then, at 306, the method does not disable the in-loop filtering in the frame. If the projection format is one of rotated sphere projection (RSP) or Cubemap (CMP) or adjusted cubemap (ACMP) then, at 308, the method includes checking if y axis location of the block is within the range [height/2−filt_size] to [height/2+filt_size]. If y axis location of the block is not within the range [height/2−filt_size] to [height/2+filt_size then at 310, the method includes performing the in loop filter. If y axis location of the block is not within the range [height/2−filt_size] to [height/2+filt_size then at 312 the method includes disabling the in-loop filter for the block.

In an embodiment, the three dimensional co-ordinates of the pixels are used to compute the location of the seam boundary. From the co-ordinate location, the boundary which shall be bypassed is uniquely identified. In an example, the block in which a decision to disable the in-loop filtering is identified. The latitude and longitude locations of all the pixels in the block are identified. If the latitude and longitude locations of all the pixels in the identified block are beyond a certain threshold, the in-loop filtering is disabled for the identified block. If the latitude and longitude locations of the pixels in the identified block are within a certain threshold, the in-loop filtering is performed for the block. The threshold to determine similarity can be set to a fixed value or can be deduced from the mean variance of latitude and longitude location in the block.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the embodiments disclosed as disclosed herein.

FIGS. 4A and 4B are example scenarios in which the deblocking filter is turned off based on whether the coding unit (CU) includes a boundary, according to an embodiment as disclosed herein. In FIG. 4A, the pixels along the seam boundary are affected by the deblocking filter, so that the deblocking filter is disabled. In FIG. 4B, the pixels along the seam boundary are not affected by the deblocking filter, so that the deblocking filter is enabled for the block.

FIG. 5 is an example scenario in which the deblocking filter is turned off based on a filtering pixel position, according to an embodiment as disclosed herein. Another procedures are explained for disabling in-loop filters wherein the filtering is disabled only for a defined number of pixels across the seam boundary. The rest of the pixels are filtered using the in-loop filter. The filtering process is controlled pixel by pixel whether the pixels on outside boundary are included in the filtering process. If the pixel is filtered by pixels on outside boundary, the pixel should not be filtered.

FIG. 6A is an example scenario in which bleeding effect is depicted due to the deblocking filter, according to an embodiment as disclosed herein. FIG. 6B is an example scenario in which the bleeding effect is eliminated by disabling the deblocking filter, while converting the spherical content to the 2D planar content, according to an embodiment as disclosed herein.

FIGS. 7A and 7B are example scenarios in which bleeding effect is shown by deblocking ON condition and deblocking off condition, according to an embodiment as disclosed herein. FIG. 7A illustrates the bleeding effect without the deblocking filter. FIG. 7B illustrates the bleeding effect with the deblocking filter.

FIG. 8A to FIG. 8D are example scenarios in which bleeding effects are shown for various conditions, according to an embodiment as disclosed herein. The FIG. 8A illustrates the bleeding effect when the deblocking filter and the ALF are ON. The FIG. 8B illustrates the bleeding effect when the deblocking filter and the ALF are OFF.

The FIG. 8C illustrates the bleeding effect when the deblocking filter is ON and the ALF is OFF. The FIG. 8D illustrates the bleeding effect when the deblocking filter is OFF and the ALF is ON.

FIG. 9A is an example scenario in which discontinuities is not aligned to a LCU boundary for a cube-map based projection format, according to an embodiment as disclosed herein.

The tiles can be multiple of LCUs which is 64×64 in case of HEVC and higher in future standards (e.g., 256×256). The FIG. 9A shows the case of cubemap based projection which shows that the face discontinuities do not necessary lie on the LCU boundaries which means that using tiles cannot be an alternative for the proposed method (i.e., in-loop filters are not applied across tiles). Similar logic is true for other 360 projection formats as well like Icosahedron Projection (ISP), rectangular subpicture (RSP) format, ACP, EAC, ECP (cubemap based projections) etc.

FIG. 9B is an example scenario in which discontinuities is not aligned to a LCU boundary for the ISP based projection format, according to an embodiment as disclosed herein. In the FIG. 9B, the discontinuities can also be diagonal which can never be LCU aligned.

FIG. 10A and FIG. 10B depict a discontinuity in case of RSP based projection format, according to an embodiment as disclosed herein. In the FIG. 10A, the discontinuities can also be along the arc which can never be LCU aligned. In the FIG. 10B, the discontinuities can also be along the arc which can never be LCU aligned. The arc edges will be containing discontinuities. If post processing is performed along these discontinuities, bleeding will occur. This results in artefacts in 360 videos. These discontinuities cannot be LCU aligned.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for producing 360 degree image content on a rectangular projection in an electronic device, comprising obtaining a 360 degree image content represented by packing one or more projection segments arranged in a rectangular projection;

detecting whether at least one discontinuous boundary is present in the 360-degree image content, wherein the at least one discontinuous boundary is detected using the packing of one or more projection segments;

obtaining one or more reconstructed blocks from the 360-degree image content, wherein the reconstructed blocks are generated from the 360 degree image content;

performing one of enabling at least one in-loop filtering function on the one or more reconstructed blocks of the 360 degree image content when the at least one of image content discontinuous boundary is not present and disabling at least one in-loop filtering function on the one or more reconstructed blocks of the 360 degree image content located around the at least one discontinuous boundary; and producing the 360 degree image content on the rectangular projection in the electronic device.

2. The method of claim 1, wherein the at least one image content discontinuous boundary is located between neighboring reconstructed blocks within the image frame.

3. The method of claim 1, wherein the image content discontinuous boundary is detected while converting a spherical content to a two dimensional (2D) planar content.

4. The method of claim 1, wherein the image content discontinuous boundary is detected while converting a non-compact projection format to a two dimensional (2D) rectangular format.

5. The method of claim 1, wherein the at least one in-loop filter comprises at least one of a deblocking filter, a Sample Adaptive Offset (SAO) filter, and an Adaptive Loop Filter (ALF).

6. The method of claim 1, wherein the at least one in-loop filter does not apply the in-loop filtering function to the reconstructed blocks located nearby the least one image content discontinuous boundary to manage a bleeding effect across the at least one image content discontinuous boundary.

7. The method of claim 1, wherein the at least one in-loop filter does not apply the in-loop filtering function to the reconstructed blocks located at the least one image content discontinuous boundary to manage at least one pixels across the least one image content discontinuous boundary within the image frame.

8. The method of claim 1, wherein the set of reconstructed blocks is processed to produce the 360-degree projection layout by applying the at least one in-loop filter in at least one continuous area in the image frame.

9. The method of claim 1, wherein the at least one in-loop filter is applied to at least one continuous area in the image frame, and the at least one in-loop filter is eliminated on the at least one of image content discontinuous boundary within the image frame.

10. The method of claim 1, wherein the at least one in-loop filter is applied in at least one of a video encoding process and a video decoding process.

11. The method of claim 1, wherein at least one of information about a projection type, a frame packing type and a loop filter disable flag is signaled in a bit-stream header, while producing the 360 degree image content on the rectangular projection.

12. The method of claim 1, wherein the at least one of image content discontinuous boundary is detected based on co-ordinates of pixels.

13. A electronic device for producing 360 degree image content on a rectangular projection, comprising
a memory;
a processor; and
an in-loop filter controller, coupled to the memory and the processor, configured for:
obtaining a 360 degree image content represented by packing one or more projection segments arranged in a rectangular projection;
detecting whether at least one discontinuous boundary is present in the 360-degree image content, wherein the at least one discontinuous boundary is detected using the packing of one or more projection segments;
obtaining one or more reconstructed blocks from the 360-degree image content, wherein the reconstructed blocks are generated from the 360 degree image content;
performing one of enabling at least one in-loop filtering function on the one or more reconstructed blocks of the 360 degree image content when the at least one of image content discontinuous boundary is not present and disabling at least one in-loop filtering function on the one or more reconstructed blocks of the 360 degree image content located around the at least one discontinuous boundary; and
producing the 360 degree image content on the rectangular projection in the electronic device.

14. The electronic device of claim 13, wherein the at least one image content discontinuous boundary is located between neighboring reconstructed blocks within the image frame.

15. The electronic device of claim 13, wherein the image content discontinuous boundary is detected while converting a spherical content to a two dimensional (2D) planar content.

* * * * *